(No Model.)
J. H. BAXTER.
Potato Digger.
No. 232,801. Patented Oct. 5, 1880.
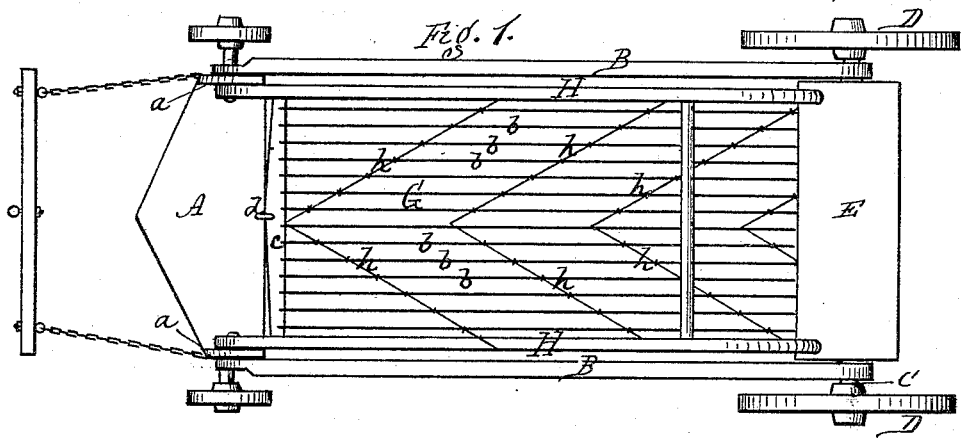
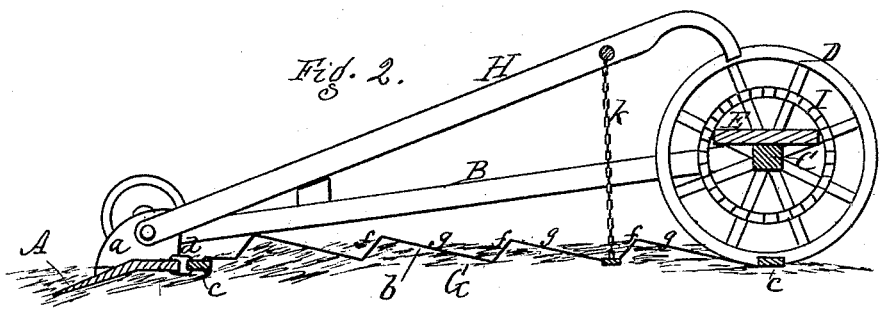
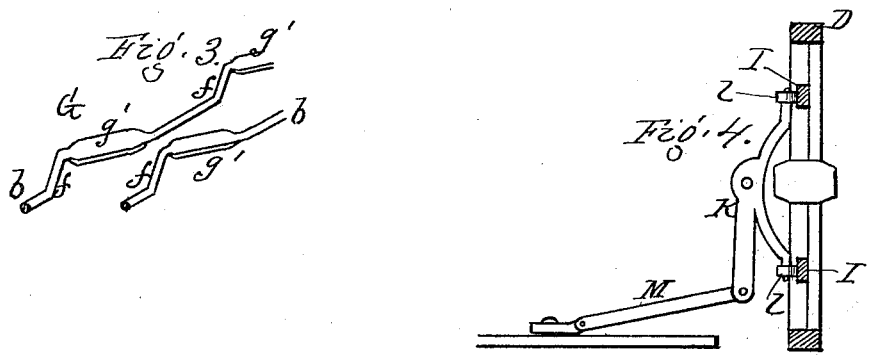
Attest.
Edward P Follett
R. E. White
Inventor.
James H. Baxter,
per R. T. Osgood,
Atty.

UNITED STATES PATENT OFFICE.

JAMES H. BAXTER, OF ADAMS' BASIN, NEW YORK.

POTATO-DIGGER.

SPECIFICATION forming part of Letters Patent No. 232,801, dated October 5, 1880.

Application filed May 7, 1880. (No model.)

*To all whom it may concern:*

Be it known that I, JAMES H. BAXTER, of Adams' Basin, Monroe county, New York, have invented a certain new and useful Improvement in Potato-Diggers; and I do hereby declare that the following is a full, clear, and exact description of the same, reference being had to the accompanying drawings, in which—

Figure 1 is a plan of the machine. Fig. 2 is a longitudinal vertical section. Fig. 3 is a perspective view of two of the wires composing the screen. Fig. 4 is a detail view, showing the apparatus for shaking the screen.

My improvement relates to potato-diggers in which a wire screen is employed; and the invention consists in the construction and arrangement of parts hereinafter more fully described and claimed.

In the drawings, A represents a scoop or scraper at the front end of the machine, which runs under the soil and elevates the potatoes. The scoop has side lugs or flanges, $a\ a$, which form guides to direct the potatoes backward upon the screen, and also serve as the attachment for the side bars and handles.

B B are two side bars, attached in front to the lugs $a\ a$ and at the rear to an axle, C, which is provided with small driving-wheels D D. On top of the axle is a platform, E, upon which the operator can stand or sit for the purpose of controlling the screen by the handles hereinafter described.

G is the screen, which is composed of a series of longitudinal wires, $b\ b$, at regular and uniform distances apart, and extending from the scoop A back beneath the rear axle. At the front and rear ends of the screen are cross-bars $c\ c$, the front one of which is pivoted or otherwise attached at $d$ to the scoop, while the rear one serves to attach the pitman hereinafter described, whereby a lateral shake motion is given to the screen.

Each of the wires composing the screen is made of zigzag form vertically, the wires being bent so as to form a short acute angle, $f$, in front and a longer angle, $g$, in the rear, as shown in Fig. 2. The sharp bends in front act as shoulders to throw the potatoes up out of the dirt, which then fall over at the rear, thus alternately rising and falling till they finally escape at the rear end of the screen fully cleaned. This screen differs from others in not being a sifter, but simply dragging loosely on top of the ground or just beneath its surface, and elevating the potatoes from the dirt as the screen passes through. The zigzag bends in the several wires alternate or break joints, so that the screen, over its whole surface, is diversified or broken up by the bends, thereby producing a better action in separating the potatoes.

$h\ h$ are small wires interwoven or bound round the main wires by being coiled over the same, and extending back in the angular directions shown, thereby strengthening the main wires and preventing their springing apart, at the same time not interfering with the separation of the potatoes from the soil. The rear bends, $g$, of the wires are flattened, or are provided with flat metallic strips attached thereto on the under side, as shown at $g'$, Fig. 3. This is for presenting a wider surface to those portions of the wires which ride up on the dirt, forming, as it were, runners, which, to a certain degree, impart vertical vibrations to the screen. They also prevent the wires from cutting too deep in the soil.

H H are handles pivoted at their front ends to the lugs $a\ a$ of the scoop, their rear curved ends projecting over and above the platform E, within reach of the operator.

$k\ k$ are chains or other connections extending from the handles down to and attached to the screen. By this means the operator can raise the rear end of the screen at any time to lighten up the dirt and raise the potatoes, or to assist the passage of the potato-tops over the screen.

I is a cam-ring on one of the driving-wheels D D; and K is a rock-lever, provided with two rollers, $l\ l$, which engage with the cam-ring and impart a vibratory movement to the rock-lever.

M is a pitman, which connects the rock-lever with the rear cross-bar of the screen.

By the means above described a lateral shake motion is imparted to the screen, which is effective in separating the potatoes and working off the vines.

At the front end of the machine are small truck-wheels for supporting the machine and gaging the depth of cut of the scoop. These wheels may be adjustable higher or lower by any suitable means. The power may be applied to the machine by chains, as shown in the drawings, or by other suitable means.

If desired, teeth may be used in front instead of the scoop. A roller may be used over the screen for breaking up and crushing lumps of dirt.

What I claim as new, and desire to secure by Letters Patent, is—

1. A potato-digger consisting of the scoop A, screen G, side bars, B B, axle C, platform E, wheels D D, and handles H H, connected with the screen by chains $k\ k$, the whole combined to operate in the manner and for the purpose specified.

2. In a potato-digger, the wires $b\ b$ of the screen, formed with the bends $f\ g$, the rear bends being flattened or formed with flat metallic strips attached thereto, as shown and described, and for the purpose specified.

In witness whereof I have hereunto signed my name in the presence of two subscribing witnesses.

JAMES H. BAXTER.

Witnesses:
R. F. OSGOOD,
JACOB SPAHN.